(12) United States Patent
Abdul-Mujeeb

(10) Patent No.: US 12,722,522 B2
(45) Date of Patent: Sep. 1, 2026

(54) SYSTEMS AND METHODS TO OPTIMIZE CONSUMPTION AND TRIP TIME OF ELECTRICALLY POWERED AERIAL VEHICLES

(71) Applicant: Nasr P Abdul-Mujeeb, Northville, MI (US)

(72) Inventor: Nasr P Abdul-Mujeeb, Northville, MI (US)

( * ) Notice: Subject to any disclaimer, the term of this patent is extended or adjusted under 35 U.S.C. 154(b) by 0 days.

(21) Appl. No.: 18/393,240

(22) Filed: Dec. 21, 2023

(65) Prior Publication Data

US 2025/0206180 A1 Jun. 26, 2025

(51) Int. Cl.

*B60L 53/80* (2019.01)
*B64U 50/31* (2023.01)
*H02S 10/20* (2014.01)
*H02S 10/40* (2014.01)
*B64U 101/30* (2023.01)

(52) U.S. Cl.

CPC .............. *B60L 53/80* (2019.02); *B64U 50/31* (2023.01); *H02S 10/20* (2014.12); *H02S 10/40* (2014.12); *B60L 2200/10* (2013.01); *B64U 2101/30* (2023.01)

(58) Field of Classification Search

CPC ...... B60L 50/31; B60L 53/80; B60L 2200/10; H02S 10/20; H02S 10/40; B64U 50/31; B64U 2101/30

USPC ........................................................ 244/53 A

See application file for complete search history.

(56) References Cited

U.S. PATENT DOCUMENTS

| | | | | |
|---|---|---|---|---|
| 11,001,386 | B2 * | 5/2021 | Kandasamy | H02S 30/20 |
| 2009/0230236 | A1 * | 9/2009 | Tillotson | H02S 10/40 244/30 |
| 2009/0292407 | A1 * | 11/2009 | Minelli | B64U 40/10 429/456 |
| 2016/0311545 | A1 * | 10/2016 | Parks | B64D 27/353 |
| 2017/0331323 | A1 * | 11/2017 | Ehrmantraut | H02S 40/38 |
| 2018/0188747 | A1 * | 7/2018 | Venturelli | G08G 5/76 |
| 2019/0322376 | A1 * | 10/2019 | Pan | B64U 50/31 |
| 2023/0081963 | A1 * | 3/2023 | James | G05D 1/6985 701/2 |
| 2023/0331408 | A1 * | 10/2023 | Wurden | B64C 25/24 |

FOREIGN PATENT DOCUMENTS

| | | | | |
|---|---|---|---|---|
| CN | 113479107 | A * | 10/2021 | B64U 50/34 |
| CN | 119079175 | A * | 12/2024 | G01S 17/86 |

* cited by examiner

*Primary Examiner* — Joshua E Rodden

(57) ABSTRACT

Systems and methods to optimize power consumption and trip time of electrically powered aerial vehicles that are required to continuously perform trips that require more electrical power than what is supplied by an onboard energy storage device. The systems include aerial vehicles equipped with photo-voltaic (PV) panels, removable energy storage devices, light sensors, power meters, global positioning satellite (GPS) modules, programmable central processing unit (PCPU) devices, telemetry equipment, artificial intelligent (AI) object recognition software and cameras, etc. The methods include a method to maximize the amount sunlight contacting the PV panels, a method to give and receive an energy storage device between two aerial vehicles using AI object recognition, while both vehicles are airborne, and a method to optimize the location for the giving and receiving of energy storage devices.

8 Claims, 12 Drawing Sheets

1
2
3
4
5
6
7
8
9
10
11
12
13
14
15
16
17

SYSTEMS AND METHODS TO OPTIMIZE CONSUMPTION AND TRIP TIME OF ELECTRICALLY POWERED AERIAL VEHICLES

FIELD OF INVENTION

The present invention generally relates to the field of electric aerial vehicles. In particular, the present invention is directed to electric power consumption and trip time optimizing methods and systems for electrically powered aerial vehicles.

BACKGROUND

Electric aerial vehicles have the potential to be used for many applications while being environmentally friendly. To fully reach this potential, electric aerial vehicle power consumption and travel time must be improved and optimized. This optimization is especially necessary for applications that require continuous, multi-trip vehicle operations. Currently, once electric aerial vehicles have exhausted their power supply, they must land and be re-charged by a stationary power source to continue aerial operations. The time needed to travel to the power source and fully charge the power supply on the aerial vehicle greatly reduces the effectiveness of an electric aerial vehicle in performing these applications.

SUMMARY OF THE DISCLOSURE

Systems and methods for optimizing power consumption and trip time of electric powered aerial vehicles are provided. The systems include an aerial vehicle with attached PV panels that will use sunlight to charge energy storage devices. The vehicle will be equipped with light sensors, power meters, and smart cameras using AI object recognition software. These devices will allow the vehicle to optimize the amount of electrical power produced by the PV panels by instructing the aerial vehicle where to move to increase sunlight contacting the vehicle. Optimizing the electrical power produced by the PV panels ensures enough fully charged energy storage devices are available for use when needed. Having enough fully charged energy storage devices available will allow aerial vehicles to not increase trip time or power consumption by having to wait on energy storage device charging.

The aerial vehicles will also have mechanisms to give and receive energy storage devices between aerial vehicles while both vehicles are airborne using AI object recognition software and cameras for vehicle alignment. The ability to give and receive energy storage devices between aerial vehicles allows aerial vehicles to not increase trip time or power consumption by waiting on energy storage device charging. The mechanism will use AI object recognition cameras to align the two aerial vehicles to give and receive the energy storage devices which provides a weight saving when compared to mechanical devices. The lower weight allows for reduced power consumption and shorter trip times.

Once an aerial vehicle needs electrical power to complete a trip or multiple trips, the aerial vehicle must travel to a place where the vehicle can obtain more electrical power either by charging an onboard energy storage device or receiving a fully charged energy storage device. The travel by the aerial vehicle, to increase electrical power, will be to another aerial vehicle having electrical power producing devices such as PV panels. The travel distance between the two vehicles will be optimized to reduce power consumption and trip time of the vehicles. This optimization will be accomplished using GPS modules, telemetry antennas and receivers, and computational software.

BRIEF DESCRIPTION OF THE DRAWING

The techniques introduced herein may be better understood by referring to the Detailed Description in conjunction with the accompanying drawings, in which reference numerals indicate identical or functionally similar elements.

The drawings are not drawn to scale. Similarly, some components or operations may be separated into different blocks or combined into a single block for the purposes of discussion of some of the implementations of the disclosed technology. The disclosed technology is intended to cover all modification, equivalents, and alternatives falling within the scope of the disclosed technology as defined by the appended claims.

DETAILED DESCRIPTION

Exemplary methods and systems are described herein. The word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods and systems can be arranged and combined in a wide variety of different configurations, all of which are contemplated herein.

The disclosed technology includes aerial vehicles (AV) and methods to optimize power consumption and trip time.

Figure 1:
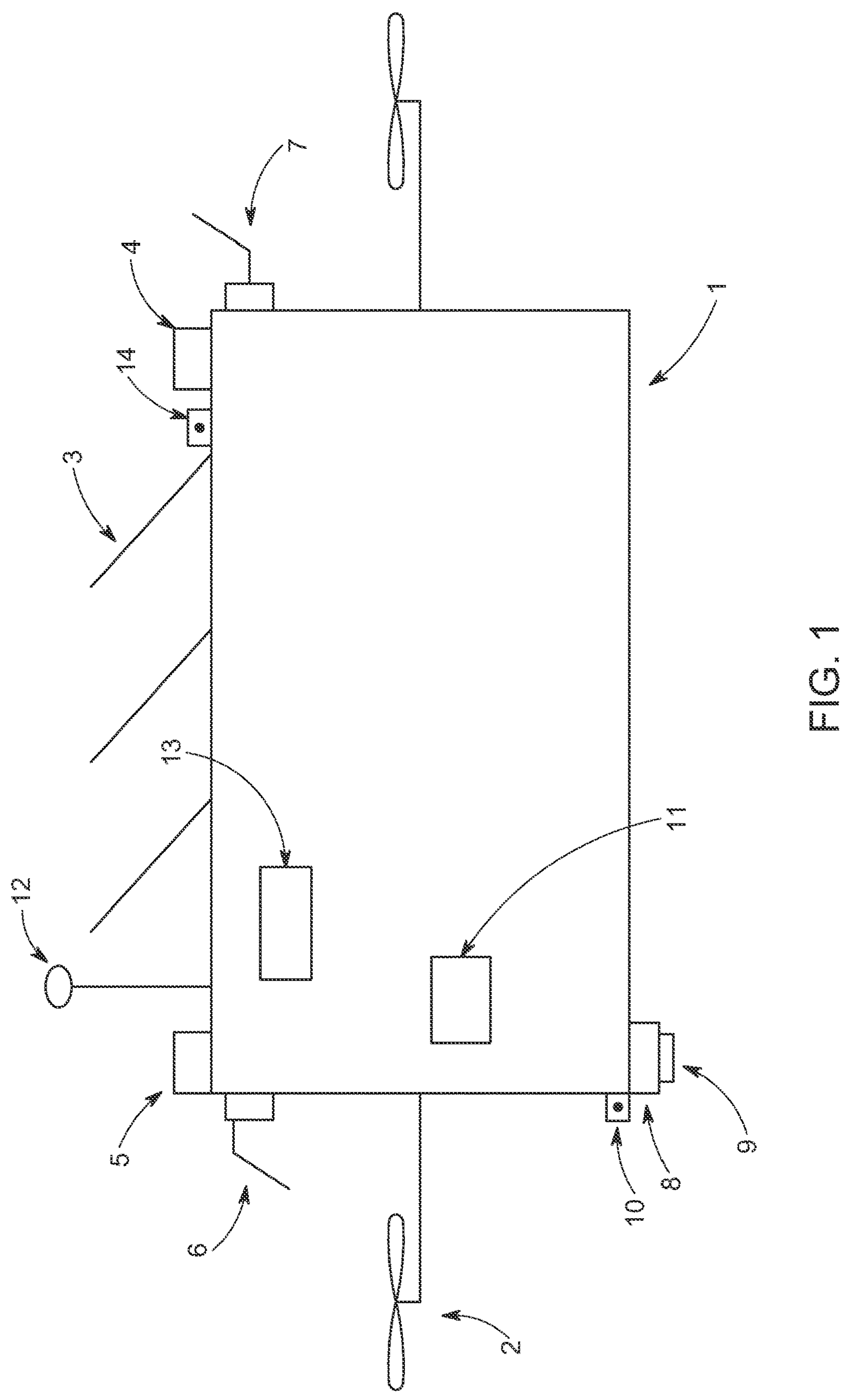
FIG. 1 illustrates an aerial vehicle with PV panels.

Referring to FIG. 1, in one embodiment, illustrates one AV (1) having a plurality of photovoltaic (PV) panels (3) to collect electrical energy from light; a plurality of motion enabling and motion stopping devices (2) such as, but not limited to, multiple airfoil rotors, electric winch connected tethers, lighter-than-air gas filled enclosure, electrical heating elements and electric gas pumps, to enable the structure to move, to stop the structure from moving, and hold the structure in a static position; a plurality of sensors such as, but not limited to, ambient light sensors and photoelectric sensors (4) for detecting a reduction in light contacting the PV panels; power meters to determine power output from PV panels (5); a programmable video camera (14) with artificial intelligence (AI) object recognition software used to recognize and provide images of the sun and sun blocking objects; GPS modules (12) and telemetry antennae (6) and receiver (7) to determine, send and receive vehicle location and speed; a grasping mechanism (8) used to hold an energy storage device (9); a second programmable video camera (10) with artificial intelligence (AI) object recognition software used to recognize an energy storage device and colored lights in order to align two AVs when giving and receiving an energy storage device (9); a programmable central processing unit (PCPU) (11) for processing signals from the above mentioned devices and activating the motion enabling devices (2) to move the structure to optimize both power consumption and trip time. The PV panels (3) attached to the AV (1) will use the energy collected from sunlight to charge the energy storage devices (9) held by the grasping mechanism (8).

Figure 2:
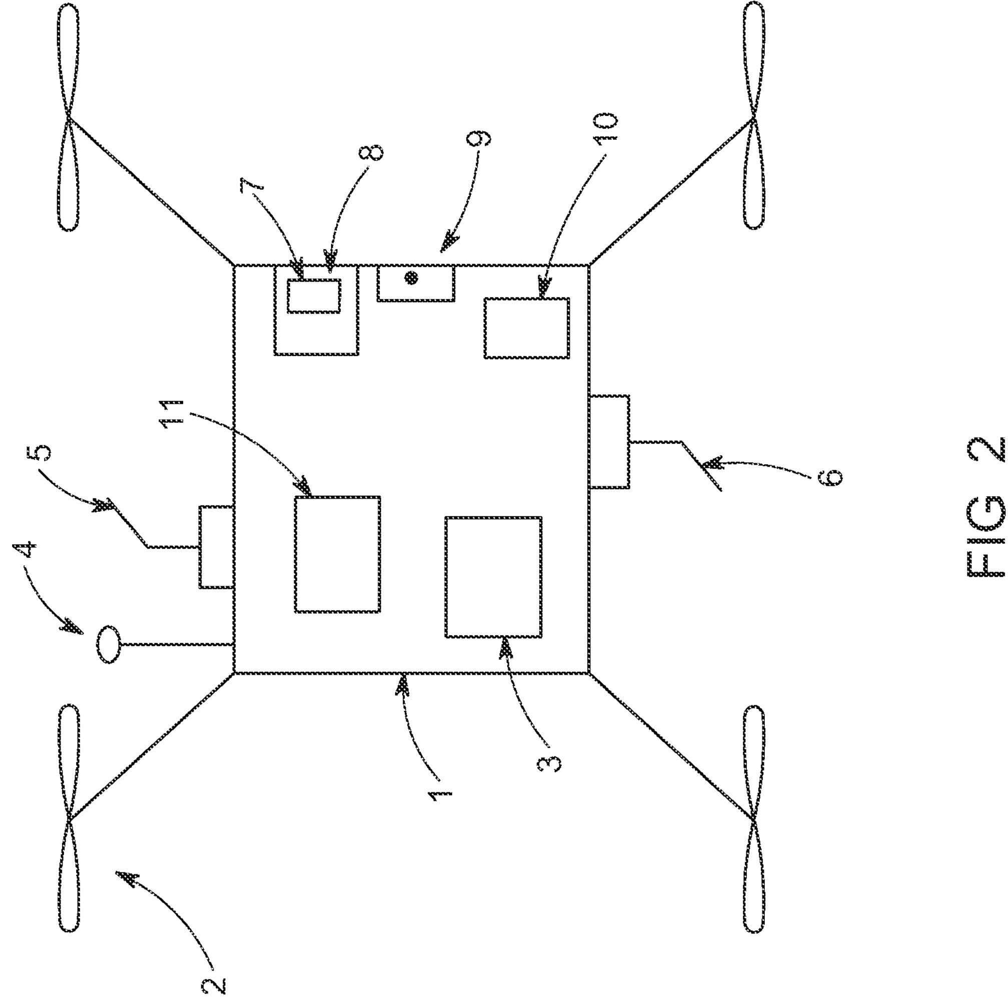
FIG. 2 illustrates an aerial vehicle.

Referring to FIG. 2, in one embodiment, illustrates an AV (1) having a plurality of motion enabling and motion stopping devices (2) such as, but not limited to, multiple airfoil rotors, electric winch connected tethers, lighter-than-air gas filled enclosure, electrical heating elements and electric gas pumps, to enable the structure to move, to stop the structure from moving, and hold the structure in a static position; a GPS modules (12) and telemetry antennae (6) and receiver (7) to determine, send and receive vehicle location; a grasping mechanism (8) used to hold an energy storage device (9); a programmable video camera (10) with artificial intelligence (AI) object recognition software used to recognize an energy storage device and colored lights in order to align two AVs when giving and receiving an energy storage device (9); a programmable central processing unit (PCPU) (11) for processing signals from the above mentioned devices and activating the motion enabling devices (2) to move the structure to optimize both power consumption and trip time.

Figure 3:
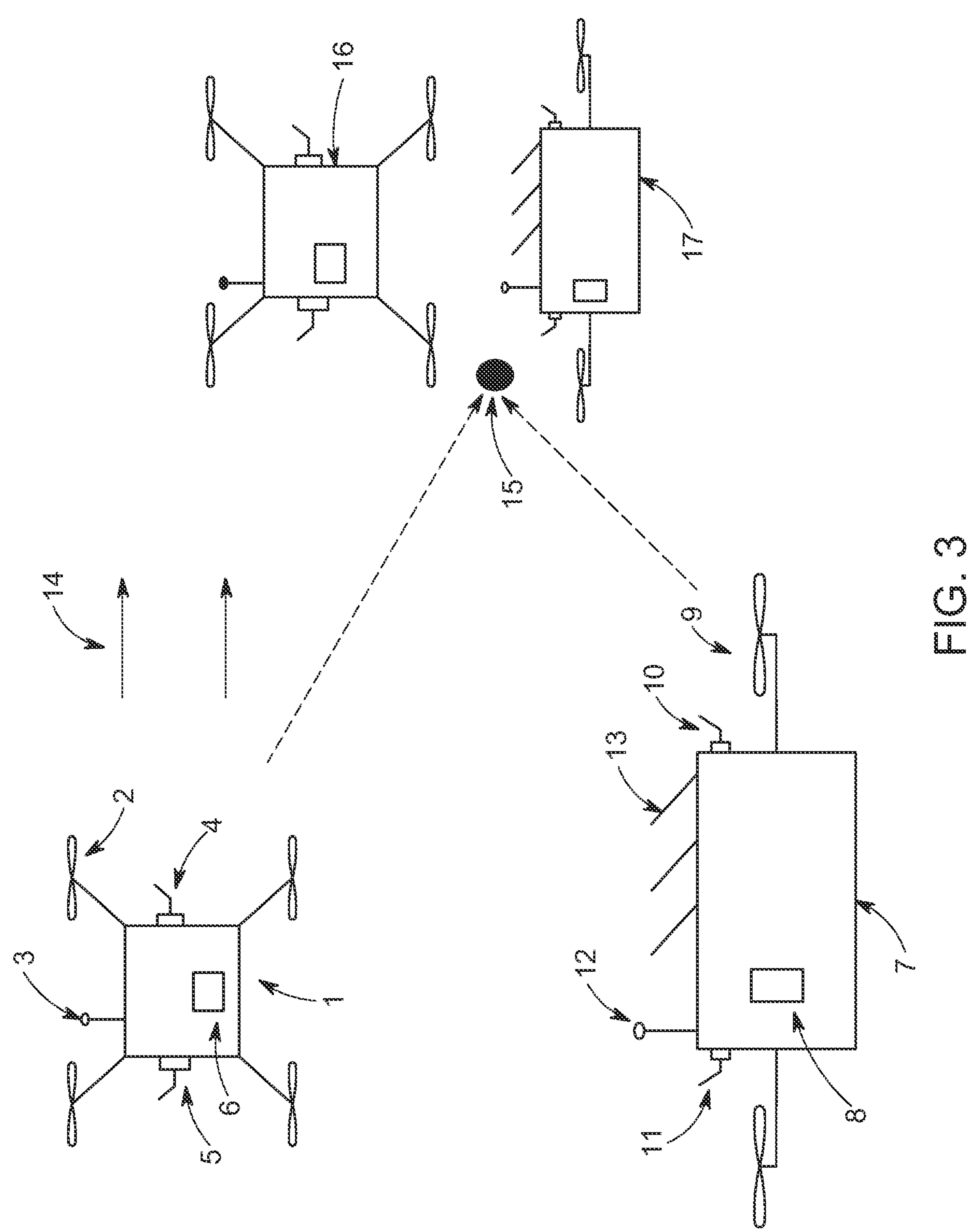
FIG. 3 illustrates aerial vehicles of meeting at an optimal location.

Referring to FIG. 3, in one embodiment, illustrates an AV (1) moving in a certain direction (14) and having the energy level of the on-board energy storage device that powers the motion enabling devices (2) fall to a certain level signaling a need to meet with another AV (7) to replace or charge the on-board energy storage device. An AV (1) has GPS modules (3) to determine and provide the destination, location and speed of the AV (1) in three-dimensional (3D) space. The GPS modules (3) will provide location and speed information to the onboard PCPU (6) and the telemetry antennae (4). The telemetry antennae (4) will send the destination, location and speed information for AV (1) to the telemetry receiver on another AV (7). An AV (7) having PV panels (13) used to charge attached energy storage devices. Additionally, AV (7) will have GPS modules (12) to determine and provide the location and speed of the AV (7) in 3D space. The GPS modules (12) will provide location and speed information to the onboard PCPU (8) and the telemetry antennae (10). The telemetry antennae (10) will send the location and speed information for AV (7) to the telemetry receiver on another AV (1). The telemetry receiver on AV (1) will send location and speed information for AV (7) to the PCPU (6) on AV (1). The telemetry receiver on AV (7) will send location and speed information for AV (1) to the PCPU (8) on AV (7).

With continued reference to FIG. 3, the PCPUs (6) (8) of the AVs (1) (7) will use a rendezvous point optimization algorithm, with the destination, location, speed information for the AVs (1) (7), to calculate the optimal meeting point (15) for the AVs (1) (7) based on low power consumption and shorter trip time. Once the optimal meeting point (15) is calculated, the PCPUs (6) (8), using the GPS modules (3) (12), will instruct the motion enabling devices (2) (9) on the AVs (1) (7) to move the AVs (1) (7) to the optimal meeting point (15). Upon arriving at the optimal meeting point (15) the AV (1) will receive a fully charged energy storage device from the AV (7) with PV panels (13) used to charge the energy storage devices. After the AV (1) receives the fully charged energy storage device, it will continue to its destination.

Figure 4:
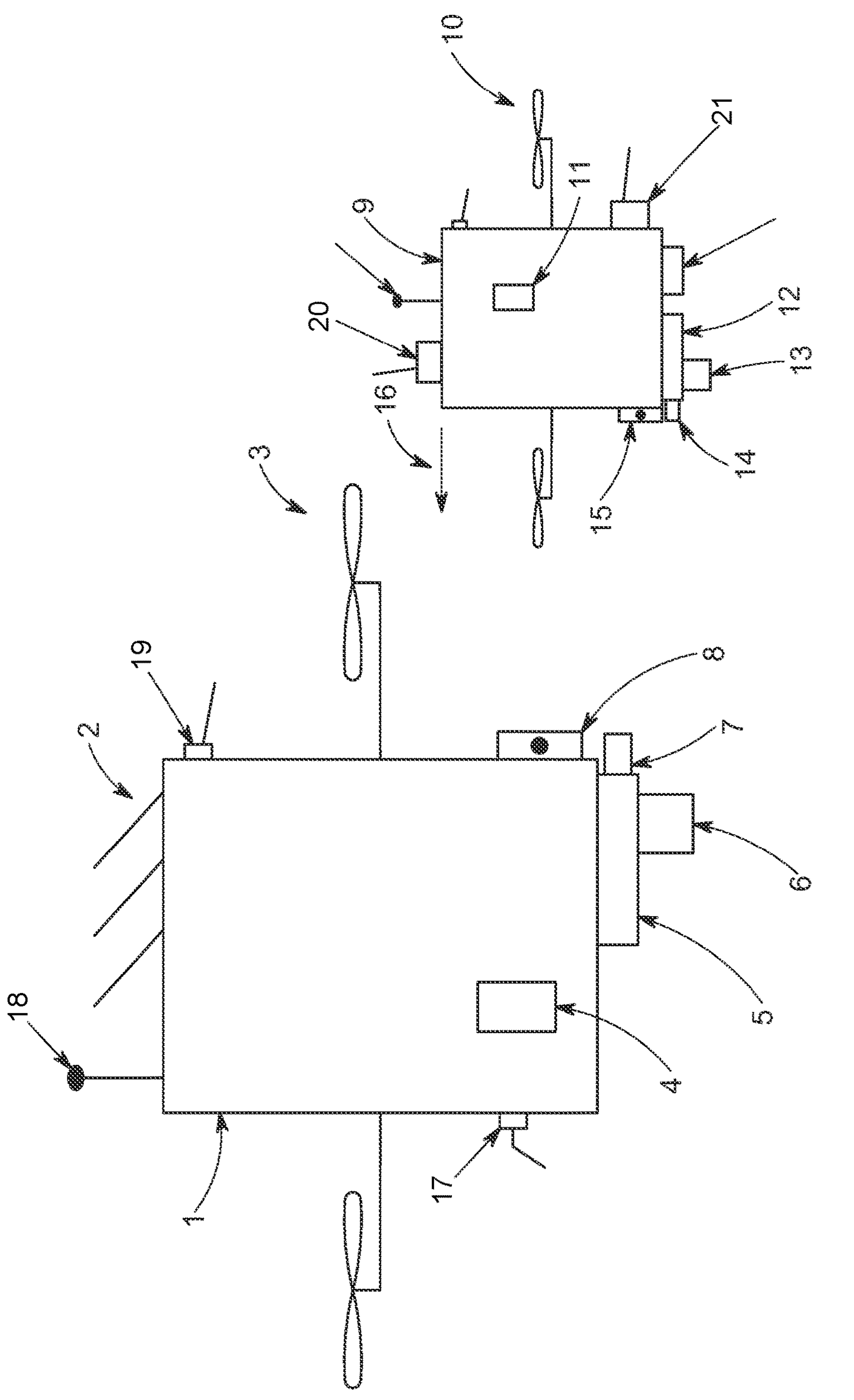
FIG. 4 illustrates aerial vehicles meeting to give and receive energy storage devices.

Referring to FIG. 4, in one embodiment, illustrates an AV (1) with PV panels (2), a plurality of motion enabling devices (3); a PCPU (4); a plurality of grasping mechanisms (5), with colored signaling lights (7), holding a plurality of energy storage devices (6); a plurality of programmable video cameras (8) with artificial intelligent (AI) object recognition software installed, a telemetry receiver (18) and antennae (19) and a GPS module (17). The PV panels (2) will be used to charge the energy storage devices (6). The programmable video cameras (8) and colored signaling lights (7) will be used to align the grasping mechanism (5) on the AV (1) with the grasping mechanism on AV (9) to facilitate the giving of fully charged energy storage devices (6) and receiving mostly discharged energy storage devices (13). The GPS modules (17) and telemetry devices (18) (19) will provide information to the PCPU (4) to find the optimal location for the giving and receiving of energy storage devices (6). The motion enabling devices (3) will be used to move the AV (1) to the optimal location and hold the AV (1) static at that location.

With continued reference to FIG. 4, in one embodiment, illustrates an AV (9), having a plurality of motion enabling devices (10), a PCPU (11), a grasping mechanism (12) holding an energy storage device (13), an empty grasping mechanism (23), a programmable video camera (15) with AI object recognition software installed, a plurality of colored signaling lights (14), a telemetry receiver (20) and antennae (22) and a GPS modules (21). The GPS modules (21) and telemetry devices (20) (22) will provide information to the PCPU (11) to find the optimal location for the giving and receiving of energy storage devices (13). The programmable video cameras (15) and colored signaling lights (14) will be used to align the grasping mechanisms (12) (23) on the AV (9) with the grasping mechanism on AV (1) to facilitate the giving of mostly discharged energy storage device (13) and receiving fully charged energy storage devices (6). The motion enabling (10) devices will be used to move the AV (9) to the optimal location and to move the AV (9) in alignment according to instructions from the PCPU (11).

Figure 5:
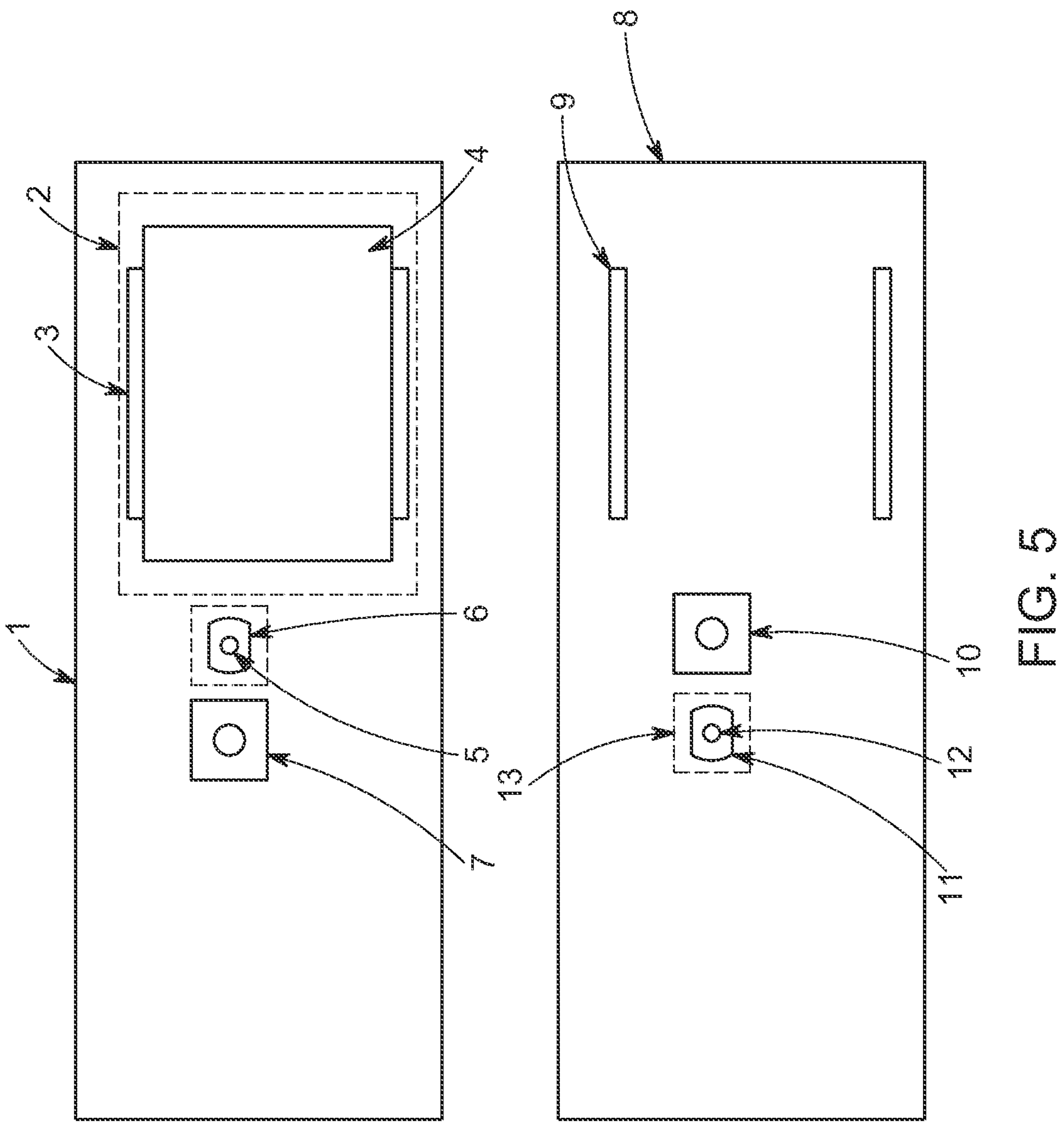
FIG. 5 illustrates object recognition camera view of energy storage devices and grasping mechanisms from vehicles.

In reference to FIG. 5, in one embodiment, illustrates a camera view (1) from a programmable video camera with AI object recognition software installed. The camera view (1) shows images of a grasping mechanism (3), an energy storage device (4), a virtual bounding box (2) around the grasping device (3) and the energy storage device (4), an image of a colored light (6) with a virtual bounding box, a virtual marker (5) for the center point of the camera view and an image of a video camera (7). The images in the camera view (1) are of items on an AV adjacent to the AV where the camera is mounted. The grasping mechanism (3) holds the energy storage devices (4). The colored lights (6) are used to signal the grasping mechanism (3) when to grasp or release an energy storage device. The bounding boxes (2) (14) surround items that are recognized by the AI object recognition software.

With continued reference to FIG. 5, in one embodiment, illustrates a camera view (8) from a programmable video camera with AI object recognition software installed. The camera view (8) shows images of a grasping mechanism (9), a video camera (10), a colored light (11) with a virtual bounding box (13), and a virtual marker (12) for the center point of camera view. The images in the camera view (8) are of items on an AV adjacent to the AV where the camera is mounted. The grasping mechanism (9) is empty. The colored lights (11) are used to signal to the grasping mechanism (9) when grasp or release an energy storage device. The bounding boxes (14) surround the color lights (11), that are recognized by the AI object recognition software.

Figure 6:
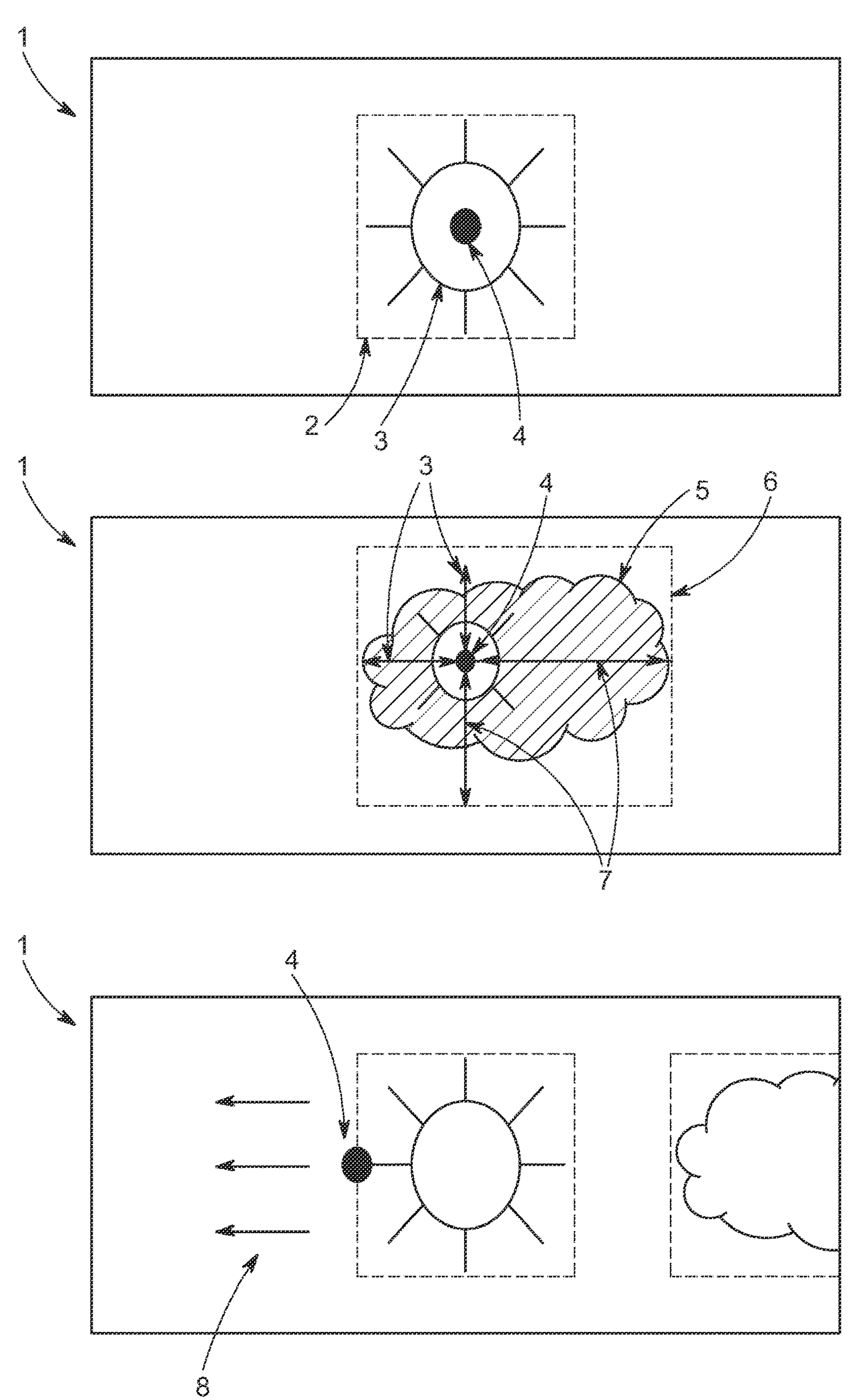
FIG. 6 illustrates object recognition camera view of light blocking elements from vehicle.

In reference to FIG. 6, in one embodiment, illustrates a camera view (1) from a programmable video camera with AI object recognition software installed. The camera view (1) shows images of the sun (3) with a virtual bounding box (2), a virtual point (4) representing the center of the camera view. FIG. 6 also illustrates a camera view (1) showing a sun blocking element (5) with a virtual bounding box (6), a virtual point (4) representing the center of the camera view, virtual arrows (7) showing the distance from the virtual center point (4) to the virtual bounding box (6) edges. Finally, FIG. 6 illustrates the movement direction of the virtual center point (4) and the camera view (1) with arrows (8). The camera view (1) now shows the sun (3) with a bounding box (2) again with the sun blocking element (5) no longer blocking the sun from the camera view.

Figure 7:
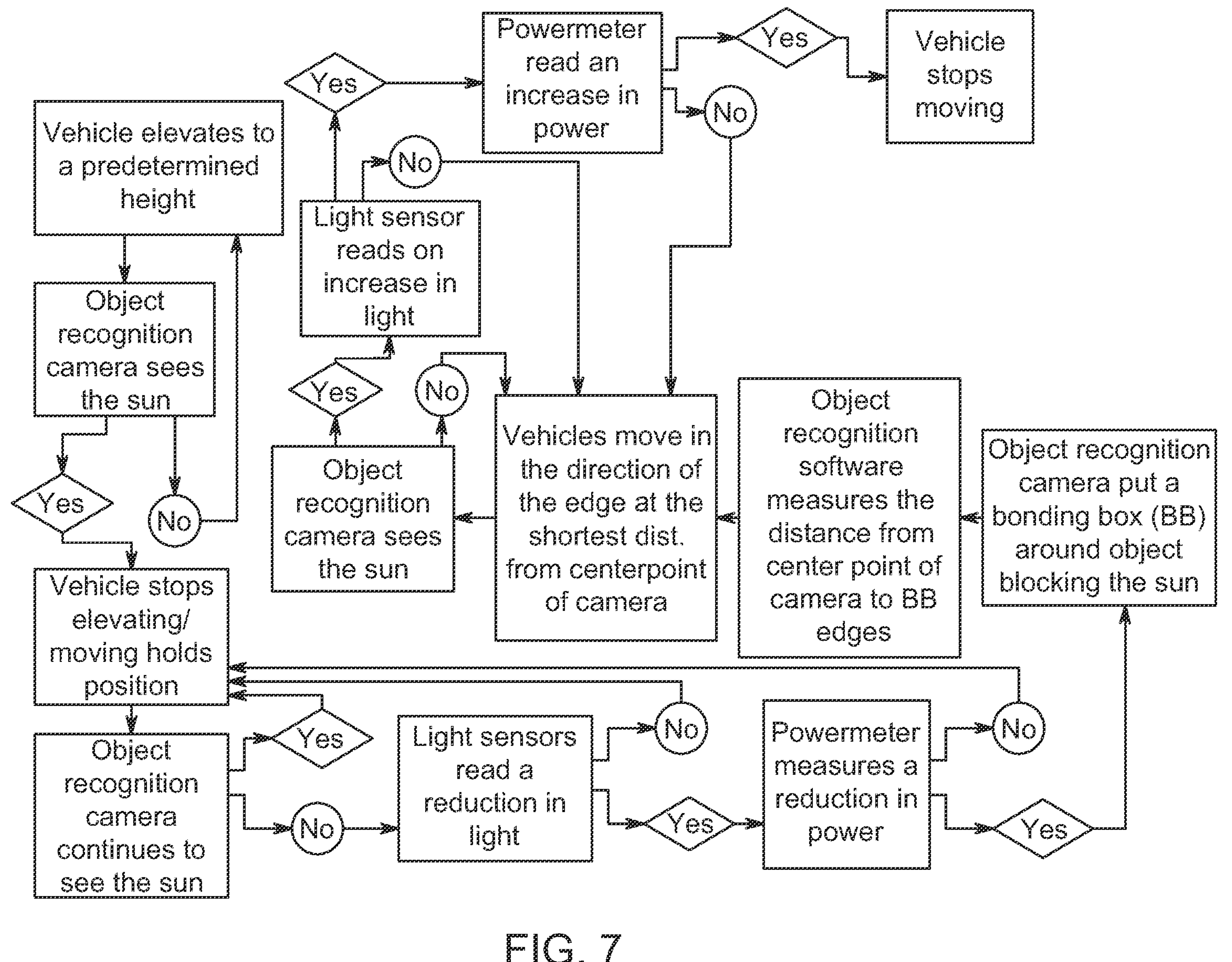
FIG. 7 illustrates a flow diagram for a process to optimize electrical production from vehicle.

In reference to FIG. 7, in one embodiment, illustrates a flow diagram with a method for changing the position of an AV to increase the amount of sunlight contacting the attached PV panels. The AV will elevate to a predetermined height above the ground and once reaching that height, will activate the onboard programmable video camera. The programmable video camera onboard the AV will have object recognition software installed. The video camera will be programmed to recognize the sun. The AV will continue to elevate until the video camera sees the sun. Once the camera sees the sun, the AV will stop elevating and hold its position and orientation. The AV will remain in that position and orientation until three conditions are met: 1. The video camera no longer sees the sun due to something blocking the sun from camera view, 2. The power meter measuring the amount of electrical power generated by PV panels detects a drop in the power generated to a predetermined level, and 3. The light sensors, measuring the amount of sunlight contacting the AV, detect a drop in sunlight contacting the AV. Once all three conditions are met, the object recognition software installed on the video camera will put a bounding box around the item blocking the camera from seeing the sun. The distance from the center of the camera view to the bounding box edges are measured. The AV will then move in the direction of the bounding box edge with the shortest distance from the center of the camera view. The AV will continue to move in that direction until three conditions are met: 1. The programmable video camera with AI object recognition software sees and recognizes the sun, 2. The power meter attached to the PV panels measures an increase in power generated by the PV panels, and 3. The light sensors detecting sunlight detect an increase in sunlight contacting the AV. Once these three (3) conditions are met the AV will stop moving and hold its position and orientation.

Figure 8:
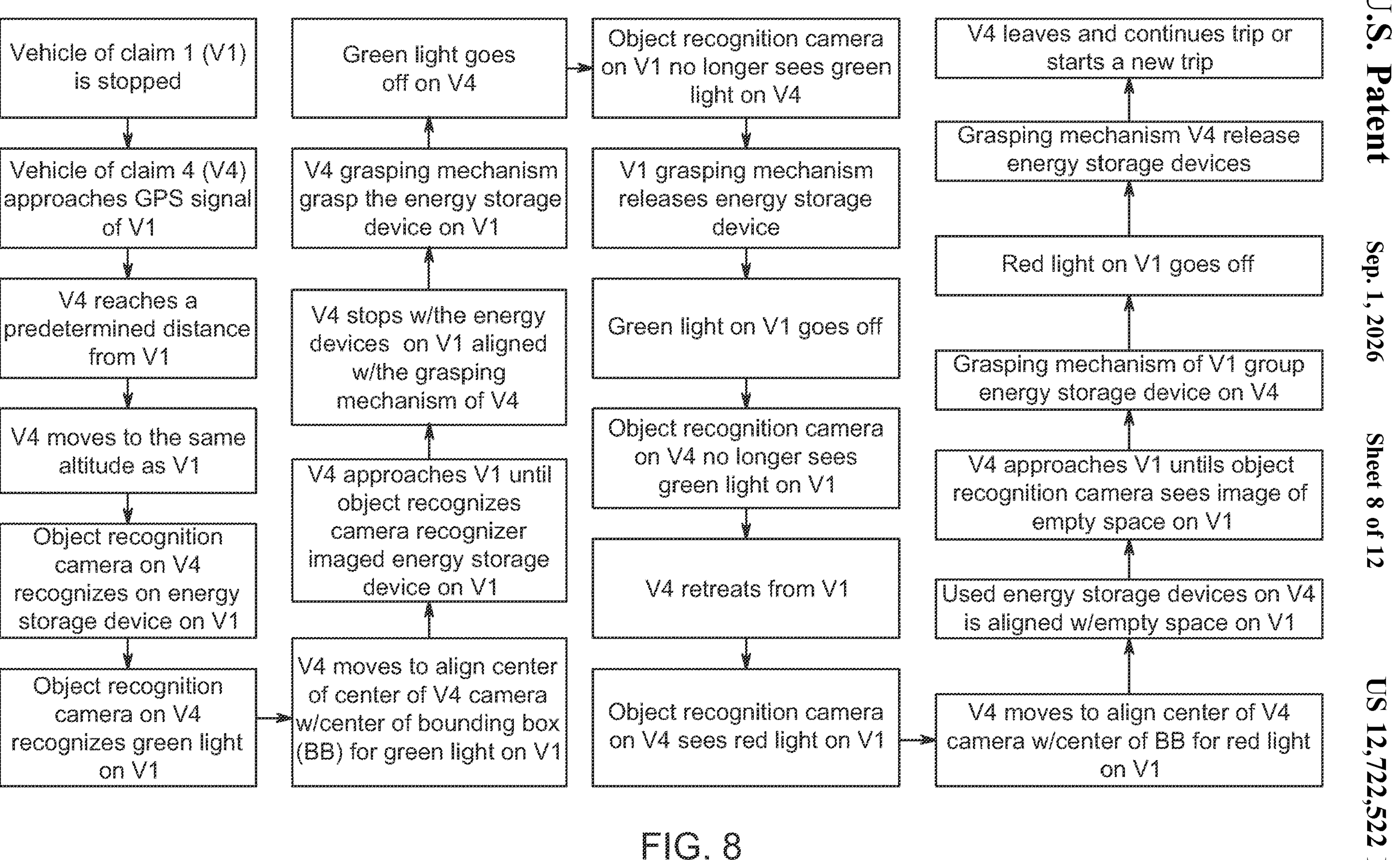
FIG. 8 illustrates a flow diagram for a process to give and receive energy storage devices on vehicles.

In reference to FIG. 8, in one embodiment, illustrates a flow diagram with a method for two AVs, aerial vehicle 1 (V1) and aerial vehicle 4 (V4), to give and receive fully charged and low charge energy storage devices, while both AVs are airborne. V1 reaches a certain location while sending out a GPS signal and V4 approaches V1 using V1's GPS signal. Once V4 reaches a predetermined distance from V1, V4 moves to the same altitude as V1. A programmable video camera with AI object recognition software on V4 recognizes an energy storage device and a green light on V1 and surrounds both with virtual bounding boxes. A programmable video camera with AI object recognition software on V1 recognizes a green light on V4 and surrounds it with a virtual bounding box. V4 moves to align the center of the onboard programmable video camera with the center of the bounding box surrounding the green light on V1 which causes the fully charged energy storage device on V1 to align with the empty grasping mechanism on V4. Once aligned, V4 approaches V1 until the programmable video camera with AI object recognition software on V4 recognizes a certain image of the fully charged energy storage device on V1. When a certain image of the fully charged energy storage device on V1 is recognized by the object recognition software on V4, V4 stops approaching V1. The empty grasping mechanism on V4 grasp the fully charged energy storage device on V1. Once the grasping mechanism on V4 grasp the energy storage device on V1, the green light on V4, being viewed and recognized by the programmable video camera on V1, goes off. The programmable video camera on V1 no longer recognizes the green light on V4 and this causes the grasping mechanism on V1 to release the fully charged energy storage device also being held by a grasping mechanism on V4. Once the grasping mechanism on V1 releases the fully charged energy storage device, the green light on V1, being viewed and recognized by the programmable video camera on V4, goes off. The programmable video camera on V4 no longer recognizes the green light on V1 and this causes V4 to move away from V1 to a predetermined distance at the same altitude. The programmable video camera with AI object recognition software on V4 then sees and recognizes, with a virtual bounding box, a red light on V1. V4 moves to align the center of the camera on V4 with the center of the bounding box surrounding the red light on V1 which aligns the now empty grasping mechanism on V1 with a low charge energy storage device on V4. Once aligned, V4 approaches V1 until the programmable video camera on V4 sees a certain image of the red light on V1. A red light activates on V4, which is seen and recognized with a virtual bounding box by the programmable video camera on V1. Once the red light on V4 is recognized by the object recognition software on V1, the empty grasping mechanism on V1 will grasp the low charge energy storage device on V4. The red light on V1 goes off and the programmable video camera on V4 no longer sees or recognizes a red light on V1. This causes the grasping mechanism on V4 to release the low charge energy storage device. V4 then retreats from V1 to a predetermined distance and continues its trip to a predetermined destination.

Figure 9:
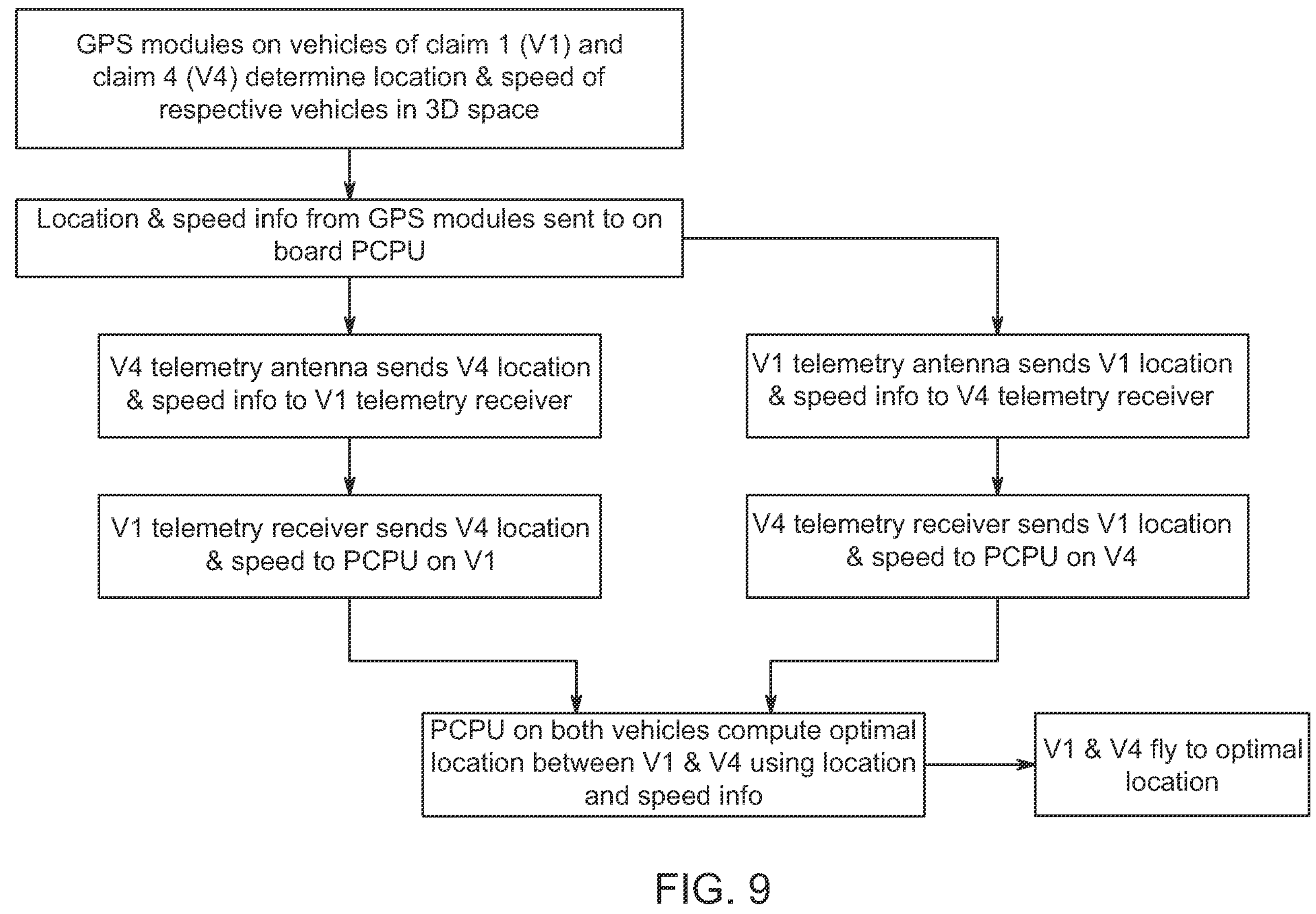
FIG. 9 illustrates a flow diagram for a process to optimize meeting location for energy replacement between vehicles.

In reference to FIG. 9, in one embodiment, illustrates a flow diagram with a method to optimize the location for the giving and receiving of energy storage devices. The GPS modules on the aerial vehicles (V1) and (V4) determine the location, destination and speed of the vehicles in three-dimensional (3D) space. The location, destination and speed information from the GPS modules will be sent to the onboard PCPUs. The V4 telemetry antennae will send the location, speed and destination information for V4 to the V1 telemetry receiver. The V1 telemetry antennae will send the location and speed information of V1 to the V4 telemetry receiver. The V1 telemetry receiver will send the location, speed and destination of V4 to the PCPU on V1. The V4 telemetry receiver will send the location and speed of V1 to the PCPU on the V4. The PCPUs on both AVs will compute the optimal meeting location between V1 and V4 with a rendezvous point optimization algorithm, using the destination, location, and speed information for the AVs. Once the optimal location is determined, the PCPUs will instruct the motion enabling devices on the AVs to move the AVs to that location.

Figure 10:
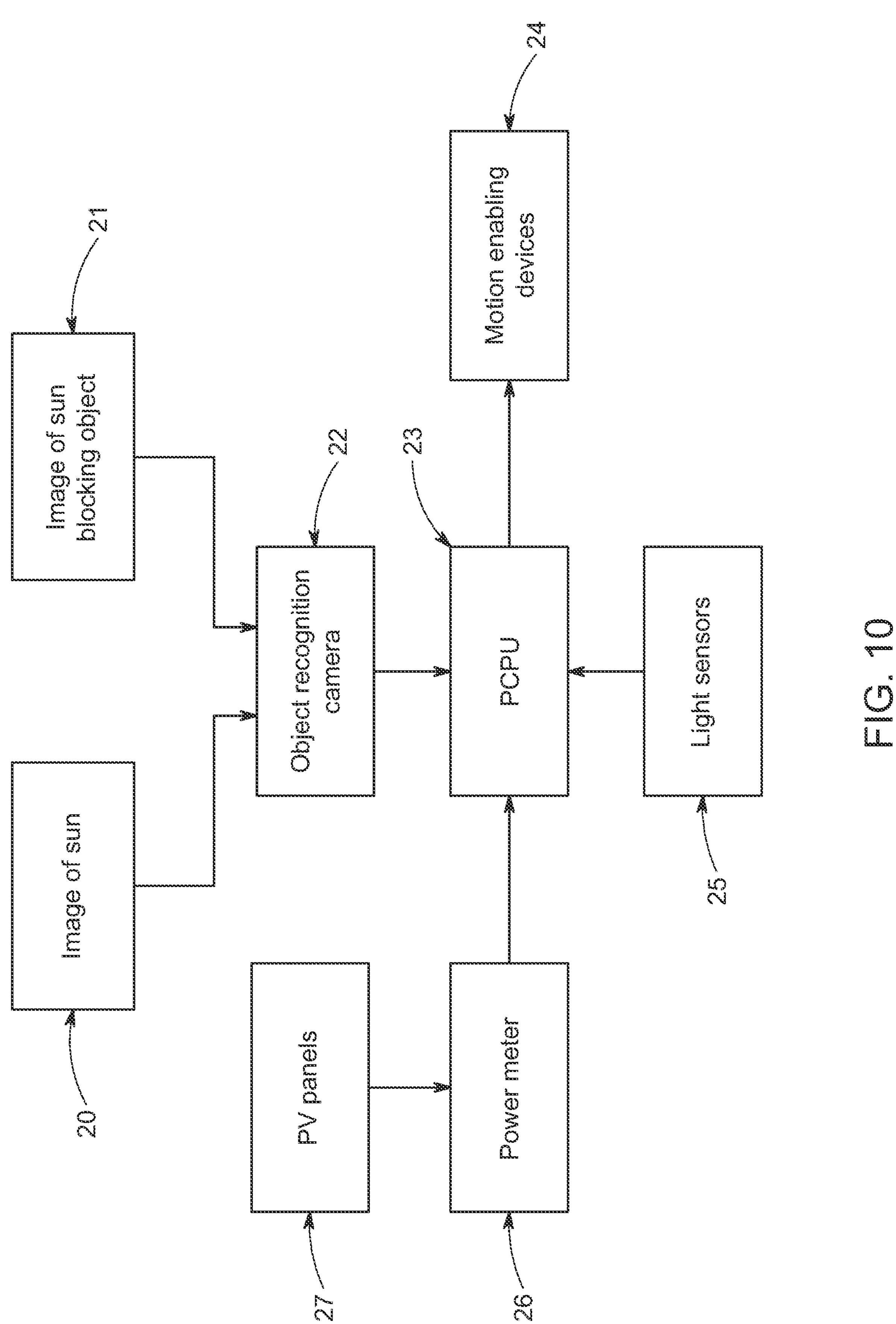
FIG. 10 is a block diagram illustrating aerial vehicle components in accordance with some implementations of the method to optimize the amount of sunlight contacting the AV.

In reference to FIG. 10, in one embodiment, a block diagram illustrating the components of one exemplary embodiment of a method that optimizes the amount of sunlight contacting the PV panels (27) attached to the AV. The attached PCPU (23) receives information from a programmable video camera (22) with AI object recognition software, electric power meters (26), and light sensors (25). The programmable video camera software has been taught to recognize both the sun (20) and sun blocking elements (21). Electrical power meters (26) measure the power output of the PV panels (27) attached to the AV. The readings from the electrical power meters (26) are sent to the PCPU (23). Light sensors (25) measure the amount sunlight contacting the AV and send the measurements to the PCPU (23). The PCPU (23) uses the information and measurements from the electrical power meters (26), the light sensors (25) and the video camera with object recognition software to instruct the motion enabling devices where to move the AV to optimize the amount of sunlight contacting the AV and the amount of electrical power produced by the PV panels (27).

Figure 11:
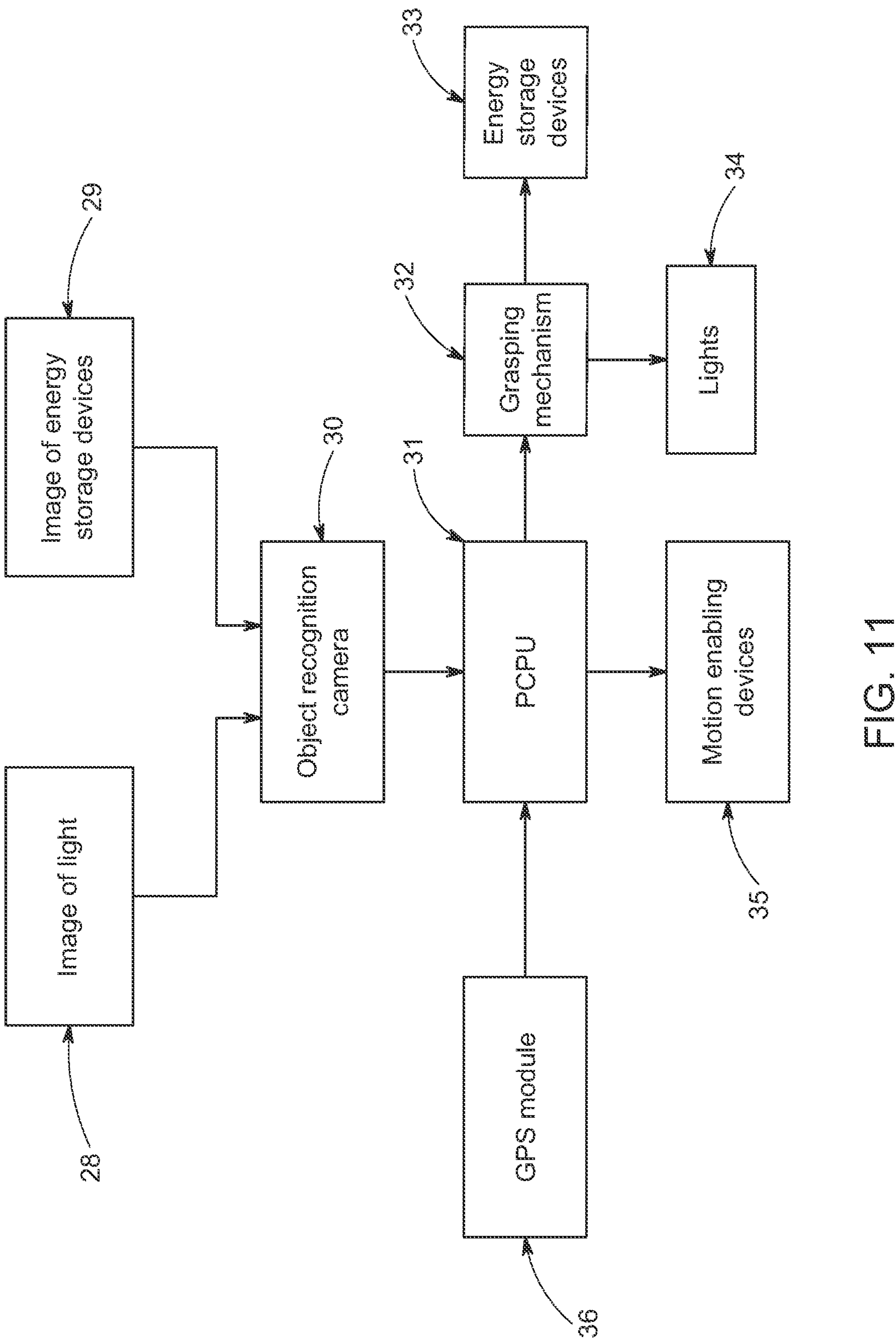
FIG. 11 is a block diagram illustrating aerial vehicle components in accordance with some implementations of the method to give and receive energy storage devices.

In reference to FIG. 11, in one embodiment, a block diagram illustrating the components of one exemplary embodiment of a method that enables the giving and receiving of energy storage devices (33) between two airborne AVs. The PCPU (32), using information provided by the GPS module (36), calculates the location for the giving and receiving of energy storage devices. The PCPU will instruct the motion enabling devices (35) to move the AV to that location. The video camera (30) with object recognition software is programmed to recognize and will display images of colored lights (28) and energy storage devices (29). The video camera (30) with object recognition software will inform the PCPU (31) when these items are recognized or no longer recognized. The PCPU (31) will use this information to align and operate the grasping mechanism (32) and lights (34). The grasping mechanism (32) holds and releases energy storage devices (33). The lights (34) on the AV are viewed by object recognition video camera (30) and signal the grasping mechanism (32) when to hold and release the energy storage device (33).

Figure 12:
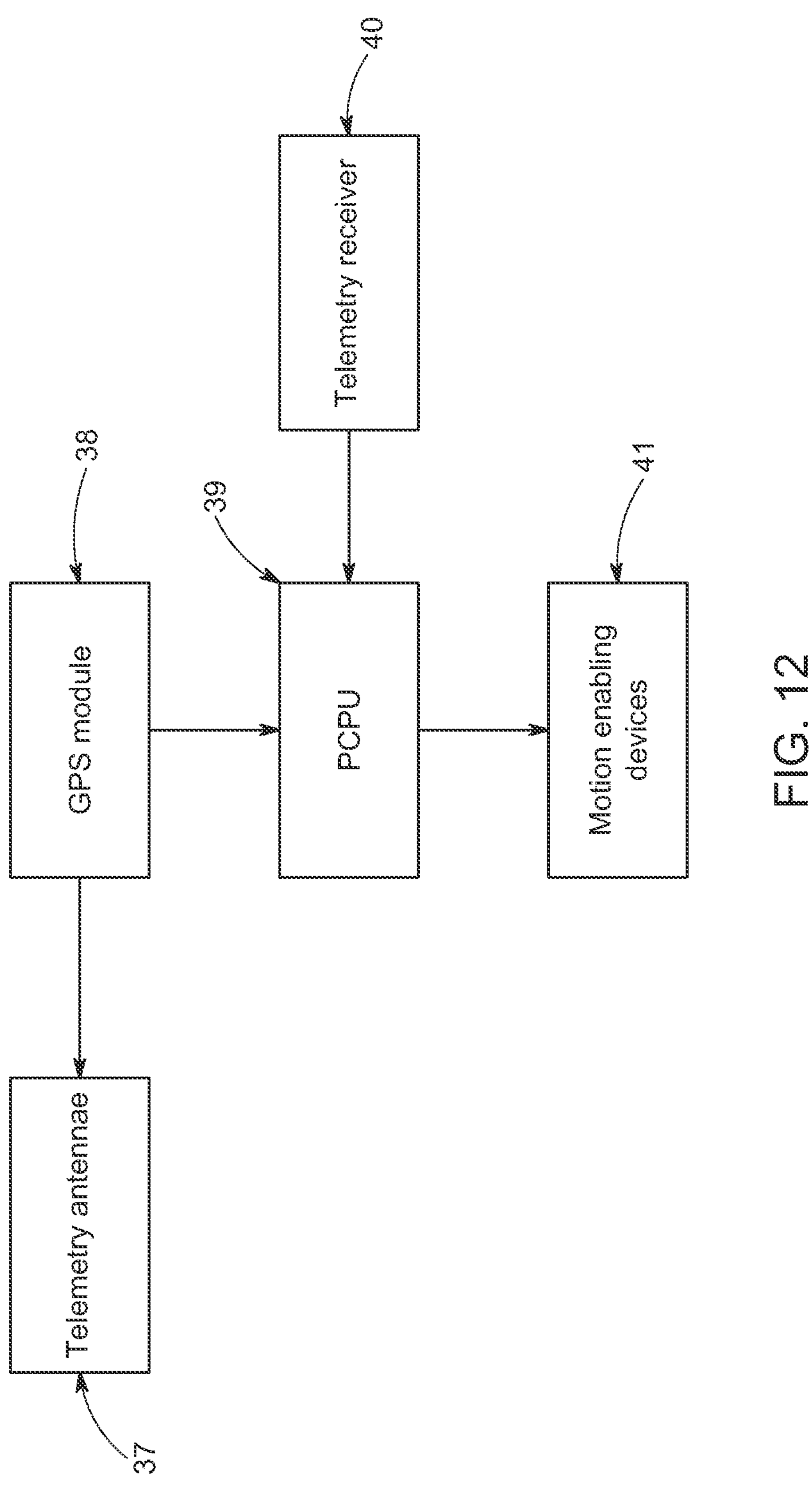
FIG. 12 is a block diagram illustrating aerial vehicle components in accordance with some implementations of the method to determine optimal location.

In reference to FIG. 12, in one embodiment, a block diagram illustrating the components of one exemplary embodiment of a method that enables a plurality of AVs to meet at an optimized location for the giving and receiving of energy storage devices. The PCPU (39) receives location and speed information of the attached AV from the GPS module (38) and receives location and speed information of other AVs from telemetry receiver (40). The GPS module (38) sends the speed, location and destination information of the attached AV to the telemetry antenna (37). The telemetry antenna (37) sends the speed, location and destination information of the attached AV to the telemetry receiver on other AVs. The PCPU (39), using the speed, location, and destination information from the GPS module (38) and the telemetry receiver (40), calculates the optimal location to meet. The PCPU (39) then instructs the motion enabling devices (41) to move the AV to that optimal location.

CONCLUSION

While a few implementations are disclosed herein, several other implementations of the disclosed technology would be clearly envisioned by those skilled in the art from the detailed description. The disclosed technology can be modified in various aspects, all without departing from the scope of the disclosed technology. For example, the electrical energy collected can be stored in the aerial structure using multiple energy storage devices such as batteries.

Reference in this specification to "one embodiment" or "an implementation" means that a feature, structure, or characteristic described in connection with the embodiment or implementation is included in at least one implementation of the disclosure. The appearances of the phrase "in one embodiment" in various places in the specification are not necessarily all referring to the same implementation, nor are separate or alternative implementations or embodiments mutually exclusive of other embodiments. Moreover, various features are described that can be exhibited by some embodiments and not by others. Similarly, various requirements are described which may be requirements for some implementations but no other implementations.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether it is highlighted. It will be appreciated that same thing can be said in more than one way.

Consequently, alternative language and synonyms may be used for any one or more of the terms discussed herein, nor is any special significance to be placed upon whether a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various implementations given in this specification.

The invention claimed is:

1. An aerial vehicle configured to become airborne, the vehicle comprising: an array of photo-voltaic (PV) panels, on at least one exterior surface of the vehicle, used to turn sunlight into electrical energy; a plurality of electrical energy storage devices which will be supplied with the electrical energy by the PV panels; an ambient light sensor, a photoelectric sensor, a power meter and programmable video cameras with artificial intelligent object recognition software taught to recognize sun and sun-blocking items, and configured to detect a change in an amount of light contacting the PV panels, a cause of the change in the amount of light and detect a change in an amount of power produced by the PV panels; a programmable central processing unit (PCPU) which receives signals from the ambient light sensor, the photoelectric sensor, the power meter and video cameras; the programmable video cameras with AI object recognition software configured to put a virtual bounding box around an image of at least one of the sun-blocking items, determine a center of a camera view and measure a distance from the center of the camera view to edges of the virtual bounding box surrounding the respective sun-blocking item, to determine where the vehicle should move to increase the amount of light contacting the photovoltaic panels and power produced by the PV panels, which will optimize renewable energy collection and energy supply to the electrical energy storage devices; a plurality of motion enabling devices including at least one of: multiple airfoil rotors, winch connected tethers, and enclosures filled with lighter-than-air gas, gas pumps and electric heating elements, which are controlled by the PCPU and activated to cause the vehicle to move to optimize both renewable energy collection and energy supplied to the electrical energy storage devices.

2. The aerial vehicle of claim 1 further comprising: a mechanism configured to give at least one of the energy storage devices, to a second aerial vehicle, that is fully supplied with electrical energy by the PV panels and receive another energy storage device from the second aerial vehicle, while both vehicles are airborne, which will allow the second aerial vehicle, which receives the energy storage device, to have an increased flight distance and time; the mechanism, when giving and receiving at least one of the energy storage devices, is configured to use artificially intelligent (AI) object recognition software installed on another programmable video camera, to align the aerial vehicle with the second aerial vehicle; the plurality of motion enabling devices configured to be activated and controlled by the PCPU to move the aerial vehicle, causing alignment with the second aerial vehicle.

3. The aerial vehicle of claim 1 further comprising: a global positioning satellite (GPS) module; a telemetry transmitter and receiver, configured to be used to determine and relay a location and speed of the aerial vehicle in 3D space and receive location, speed and destination information of another aerial vehicle; GPS location and telemetry receiver information configured to be sent to the PCPU; software installed on the PCPU, configured to use the location, speed and destination information, to determine an optimal location, based on low power consumption and reduced trip time, for the giving and receiving of the energy storage devices; the plurality of motion enabling devices configured to cause the aerial vehicle to move to the optimal location.

4. A method to optimize renewable energy collection of the aerial vehicle of claim 1, by detecting the change in the amount of light contacting the PV panels, the change in the amount of power produced by the PV panels, and the programmable video cameras with AI object recognition software recognizing the sun and sun-blocking items; the method comprising the programmable video cameras with AI object recognition software putting the virtual bounding box around the image of the at least one of the sun-blocking items; the method comprising the programmable video cameras with AI object recognition software determining the center of the camera view and measuring the distance from the center of the camera view to the edges of the virtual bounding box surrounding the at least one of the sun-blocking items; the method comprising sending the information about the change in the amount of light contacting the PV panels, about the change in the amount of power produced by the PV panels and about the distance from the center of the camera view to the edges of the virtual bounding box surrounding the image of the at least one of the sun-blocking items, to the PCPU; the PCPU, using this information, activating the motion enabling devices to move the vehicle to increase light contacting the PV panels and optimize renewable energy collection.

5. A method to give and receive the electrical energy storage devices between the aerial vehicle of claim 1 and a second aerial vehicle, while both vehicles are airborne; the method using the artificially intelligent object recognition software, the programmable video cameras, and the PCPU to align the two vehicles to effectuate the giving and receiving of the energy storage devices; the method using the programmable video cameras on the aerial vehicle to recognize images of the energy storage devices seen by the programmable video cameras; the PCPU activating the motion enabling devices to move the aerial vehicles to properly align so the energy storage devices are configured to be given and received between the aerial vehicles while both vehicles are airborne.

6. A method to optimize a location for the giving and receiving of the energy storage devices, between the aerial vehicle of claim 1 and a second aerial vehicle, based on lowering vehicle power consumption and a shorter travel time; the method using GPS modules, telemetry transmitter and receivers, and the PCPU; the PCPU receiving location information from the GPS modules and the telemetry transmitter and receivers; the telemetry transmitter and receivers sending vehicle location information to other vehicles; the PCPU using the location information provided by the GPS modules and telemetry transmitter and receivers, and calculating the location for the giving and receiving of the energy storage devices, optimizing the location for lower power consumption and shorter travel time.

7. An aerial vehicle configured to become airborne, the vehicle comprising: at least one removable energy storage device; a PCPU device; an empty space where the removable energy storage device is configured to be held and connected, to provide power to electrical components of the vehicle, including motors, the PCPU device, and sensors; a mechanism to receive, into the empty space, a fully supplied energy storage device from a second aerial vehicle and give the removable energy storage device to the second vehicle to be supplied with electrical energy from PV panels; the mechanism, when receiving and giving the fully supplied energy storage device and the removable energy storage device, will use artificially intelligent object recognition software installed on a programmable video camera, to align the aerial vehicle with the second aerial vehicle; a plurality of motion enabling devices, including at least one of: multiple airfoil rotors, winch connected tethers, and enclosures filled with lighter-than-air gas, gas pumps and electric heating elements, which are controlled by the PCPU device and configured to be activated to cause the vehicle to move to align with the second aerial vehicle.

8. The aerial vehicle of claim 7 comprising: a plurality of devices, including a global positioning satellite (GPS) module and a telemetry transmitter and receiver, used to determine and relay a location, speed and destination information of the aerial vehicle in 3D space, to the second aerial vehicle and receive location, speed and destination information of the second aerial vehicle; information from the GPS module and the telemetry transmitter and receiver will be sent to the PCPU device on the aerial vehicle; the PCPU device is configured to determine an optimal location, using the speed, location and destination information and based on low power consumption and reduced trip time, for the giving and receiving of the energy storage devices; the plurality of motion enabling devices configured to cause the aerial vehicle to move to the optimal location.

* * * * *